US006945219B2

(12) United States Patent
Strauss

(10) Patent No.: US 6,945,219 B2
(45) Date of Patent: Sep. 20, 2005

(54) DUAL ZONE COMBUSTION CHAMBER

(75) Inventor: Sebastian Strauss, Pleasant Prairie, WI (US)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/708,099

(22) Filed: Feb. 9, 2004

(65) Prior Publication Data
US 2005/0172929 A1 Aug. 11, 2005

(51) Int. Cl.[7] ................................. F02B 5/00
(52) U.S. Cl. .................... 123/305; 123/298; 123/260
(58) Field of Search ................. 123/253, 260, 123/261, 266, 268, 275, 285, 73 C, 661, 123/298, 305, 269

(56) References Cited

U.S. PATENT DOCUMENTS

| 3,020,900 | A | 2/1962 | Hoffman |
| 3,498,276 | A | 3/1970 | Hardenberg |
| 3,945,351 | A | 3/1976 | Kimbara et al. |
| 4,164,913 | A | 8/1979 | Komiyama et al. |
| 4,176,628 | A | 12/1979 | Kanai et al. |
| 4,207,843 | A | 6/1980 | List et al. |
| 4,221,190 | A | 9/1980 | Komiyama et al. |
| 4,433,616 | A | 2/1984 | Hauser, Jr. |
| 4,510,895 | A | 4/1985 | Slee |
| 4,617,887 | A | 10/1986 | Nagase et al. |
| 4,676,208 | A | 6/1987 | Moser et al. |
| 4,693,219 | A | 9/1987 | Burgio |
| 4,770,138 | A | 9/1988 | Onishi |
| 4,883,032 | A | 11/1989 | Hunter et al. |
| 4,941,440 | A | 7/1990 | Weber et al. |
| 4,972,898 | A | 11/1990 | Cole |
| 5,020,485 | A | 6/1991 | Watanabe |
| 5,158,055 | A | 10/1992 | Oh et al. |
| 5,209,200 | A | 5/1993 | Ahern et al. |
| 5,357,924 | A | 10/1994 | Onishi |
| 5,595,145 | A | 1/1997 | Ozawa |
| 5,605,126 | A | 2/1997 | Hofmann et al. |
| 5,813,385 | A | 9/1998 | Yamauchi et al. |
| 5,829,407 | A * | 11/1998 | Watson et al. ............ 123/275 |
| 5,960,767 | A | 10/1999 | Akimoto et al. |
| 5,970,946 | A | 10/1999 | Shea et al. |
| 6,003,479 | A | 12/1999 | Evans |
| 6,035,822 | A | 3/2000 | Suzuki et al. |
| 6,035,823 | A | 3/2000 | Koike et al. |
| 6,098,589 | A * | 8/2000 | Klenk et al. ............ 123/295 |
| 6,116,211 | A | 9/2000 | Suzuki et al. |
| 6,138,639 | A | 10/2000 | Hiraya et al. |
| 6,158,409 | A | 12/2000 | Gillespie et al. |
| 6,161,518 | A | 12/2000 | Nakakita et al. |
| 6,173,690 | B1 | 1/2001 | Iriya et al. |
| 6,186,113 | B1 | 2/2001 | Hattori et al. |
| 6,209,514 | B1 | 4/2001 | Matayoshi et al. |
| 6,253,728 | B1 | 7/2001 | Matayoshi et al. |
| 6,257,199 | B1 | 7/2001 | Kanda et al. |
| 6,263,855 | B1 | 7/2001 | Kobayashi et al. |
| 6,269,789 | B1 | 8/2001 | Abe et al. |
| 6,269,790 | B1 | 8/2001 | Yi et al. |

(Continued)

Primary Examiner—John T. Kwon
(74) Attorney, Agent, or Firm—BRP Legal Services

(57) ABSTRACT

A combustion chamber and method of distributing fuel in a combustion chamber is disclosed. The combustion chamber includes a first section that is generally centrally positioned in the combustion chamber. A second section is offset from the first section and maintains a uniform distance between a fuel spray and a perimeter of the second section. Such a combustion chamber improves combustion by maintaining a generally uniform fuel spray spacing to the combustion chamber walls.

21 Claims, 4 Drawing Sheets

U.S. PATENT DOCUMENTS

| | | |
|---|---|---|
| 6,311,668 B1 | 11/2001 | Milam |
| 6,314,933 B1 | 11/2001 | Iijima et al. |
| 6,334,426 B1 | 1/2002 | Sasaki et al. |
| 6,336,437 B1 | 1/2002 | Baika et al. |
| 6,338,327 B1 | 1/2002 | Ogi et al. |
| 6,349,697 B1 | 2/2002 | Kanda et al. |
| 6,378,486 B1 | 4/2002 | Spiegel et al. |
| 6,378,490 B1 | 4/2002 | Ottowitz et al. |
| 6,435,007 B1 | 8/2002 | Smith et al. |
| 6,443,121 B1 | 9/2002 | Carroll et al. |
| 6,443,122 B1 | 9/2002 | Denbratt et al. |
| 6,460,509 B1 | 10/2002 | Muramatsu et al. |
| 6,468,122 B1 * | 10/2002 | Clements et al. ......... 440/88 R |
| 6,499,457 B2 | 12/2002 | Suzuki et al. |

* cited by examiner

DUAL ZONE COMBUSTION CHAMBER

BACKGROUND OF INVENTION

The present invention relates generally to combustion chambers for internal combustion engines, and more particularly, to a combustion chamber having a multi-zone construction.

In general, fuel injected engines include multiple cylinders that receive an atomized fuel injected into the cylinder. The fuel injector provides a fine mist of fuel that mixes with combustion generating gases, generally a mixture of fresh air and any remaining exhaust gases, within the cylinder. This mixture is then compressed and either spark ignited in gasoline engines, or compression ignited in diesel engines. While diesel engines may realize benefits from the present invention, it is primarily directed to fuel injected, spark ignited engines.

In this category of engines, the present invention is applicable to both two-cycle, or two-stroke, and four-stroke engines. Two-stroke engines are those engines that produce a power stroke with every rotation of the crank shaft. Direct fuel injected engines are those having a fuel injector arranged to inject fuel directly into the cylinder as opposed to port fuel injected engines that mix air and fuel before entry into the cylinder. Two-stroke engines are generally believed to be more prone to high exhaust emissions. The two-stroke engine industry, if it is to survive, must maximize efficiency and minimize the emissions to comply with governmental regulations. In the last few years, many advances have been made to advance two-stroke engines toward these goals. Since two-stroke engines are significantly lighter in weight than four-stroke engines, they have a distinct advantage. Recently, two-stroke engines, such as those incorporated into the EVINRUDE outboard motor and manufactured by the Assignee of the present invention, have resolved fuel efficiency concerns and reduced emissions to levels unheard of just a few years ago. Two-stroke engines now hold a distinct advantage over four-stroke engines. However, further advancement is desirable to further increase the desirability of two-stroke engines over four-stroke engines in various applications, such as those described above. Two-cycle engines that employ direct fuel injection will receive the most beneficial results with use of the present invention, however, other engines may benefit as well.

In order to improve the combustion process and reduce emission in the exhaust gases, it is desirable to obtain effective mixing and atomization of the fuel and combustion gas within the cylinder space. In so doing, it is desirable to prevent fuel from being accumulated on any surfaces of the combustion chamber. These surfaces include the face of the piston, the cylinder walls, and the area of the cylinder head enclosing the combustion chamber. Fuel accumulated on these surfaces is generally more difficult to ignite than atomized fuel mixed with air.

Fuel injected into the combustion chamber that is not thoroughly atomized and dispersed within the combustion chamber can create areas of uneven combustion. Areas of the combustion mixture having too little fuel lead to a lean burn and areas having too much fuel result in a rich burn. It is widely known that uneven burning combustion results in higher levels of pollutants in the exhaust gas as compared to the level of pollutants generated from a burn that is more fully atomized and dispersed within the spark zone.

Additionally, regions of high fuel concentration require more time for the fuel to burn as compared to areas where the fuel concentration is not as high which leads to inefficient use of the fuel. Often this time delay allows the temperature in the cylinder to drop to a point where the fuel is not readily burned. This type of uneven burning, as discussed above, leads to increased hydrocarbon and soot emissions from the engine. As such, it is important that the fuel injected into the combustion chamber not form regions of excessively high concentrations within the mixture.

These regions of high concentration are partially formed, in direct injection engines, by the proximity of the initial fuel spray to the walls of the combustion chamber. A fuel spray that is offset towards a wall of the combustion chamber experiences uneven mixing of the combustion gas and fuel spray. This uneven mixing detrimentally effects the entrainment, or mixing, of the combustion charge with the combustion gases and tends to result in increased engine emissions and decreased fuel efficiency.

Some direct injected engines focus a fuel spray into a dome formed concentrically in the cylinder head so that the fuel spray is positioned concentrically in the dome. This arrangement decreases the deposit of fuel on the combustion chamber walls of the dome but has a tendency to increase the amount of fuel impinged directly on the face of a piston in the combustion chamber. Additionally, having the fuel spray directed into the combustion chamber coaxially with the axis of reciprocation of the piston, while centering the combustion charge at ignition, also results in increased engine emissions. In two-stroke engines, by directing the fuel spray into the center of the combustion chamber increases the amount of unburned fuel that can exit the combustion chamber through the exhaust port. This unburned fuel increases the level of emissions discharged from the engine and reduces the fuel efficiency of the engine.

While the simple solution would be to tilt the spray in the cylinder head to face toward the intake port, doing so places the fuel spray closer to one side of the combustion chamber thereby increasing the potential for the fuel spray to be deposited on a wall of the combustion chamber. In order to maximize combustion efficiency, it would be preferable to burn the individual droplets of the fuel spray on the entire surface of the droplet. The droplets that are on or too close to the walls of the combustion chamber burn unevenly, and therefore, inefficiently. Also as discussed above, having the fuel spray passing through the combustion chamber closer to one wall than to another reduces the generation of a uniform combustion charge with maximized mixing of the fuel spray and the combustion gases.

It would therefore be desirable to have an engine with a combustion chamber arrangement that could receive a fuel mixture from a fuel injector and both provide a uniform spacing of the fuel spray from the walls of the combustion chamber and centralize a combustion charge in the combustion chamber for ignition.

SUMMARY OF INVENTION

The present invention provides a combustion chamber that solves the aforementioned problems. The combustion chamber includes a first section that is generally centrally positioned in the combustion chamber. A second section is offset from the first section and maintains a uniform distance between a fuel spray and a perimeter of the second section. Such a combustion chamber improves combustion efficiency and reduces combustion emissions from an engine so equipped.

In accordance with one aspect of the present invention, a combustion chamber for a two-cycle engine is disclosed that includes a first zone and a second zone. The first zone has an axis of symmetry generally aligned with a cylinder bore and the second zone has an axis of symmetry generally aligned with a fuel spray projection from a fuel injector. The axis of symmetry of the second zone is skewed and offset from the axis of symmetry of the first zone.

According to a further aspect of the present invention, an engine is disclosed that includes a block having at least one piston reciprocally disposed in a cylinder of the block. A cylinder head is attached to the block over the piston and cylinder and has a combustion chamber aligned with the cylinder defining a squish zone between the piston and cylinder head. The combustion chamber has a lower portion and an upper portion. The lower portion has a cross-sectional shape that is asymmetric about a central axis of the cylinder and the upper portion is positioned generally coaxially about a fuel spray pattern and has a first side configured to receive a spark plug therein and a second side in contact with the lower portion.

In accordance with another aspect of the present invention, a combustion chamber is disclosed has a first recess and a second recess. The first recess is formed in a cylinder head and having an angle of penetration of less than 90 degrees from a horizontal as determined from an intake side of a cylinder. The second recess is interconnected with the first recess and has an angle of penetration greater than 90 degrees from the horizontal as determined from the intake side of the cylinder.

According to yet a further aspect of the present invention, a method of distributing fuel in a combustion chamber is disclosed that includes the steps of passing a fuel spray past a first portion of a dome of a cylinder head such that a periphery of the fuel spray is equidistant from a wall defining the first portion. The process also includes passing the fuel spray past a second portion of the dome of the cylinder head such that the fuel spray is an unsymmetrical distance from a wall of the second portion.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
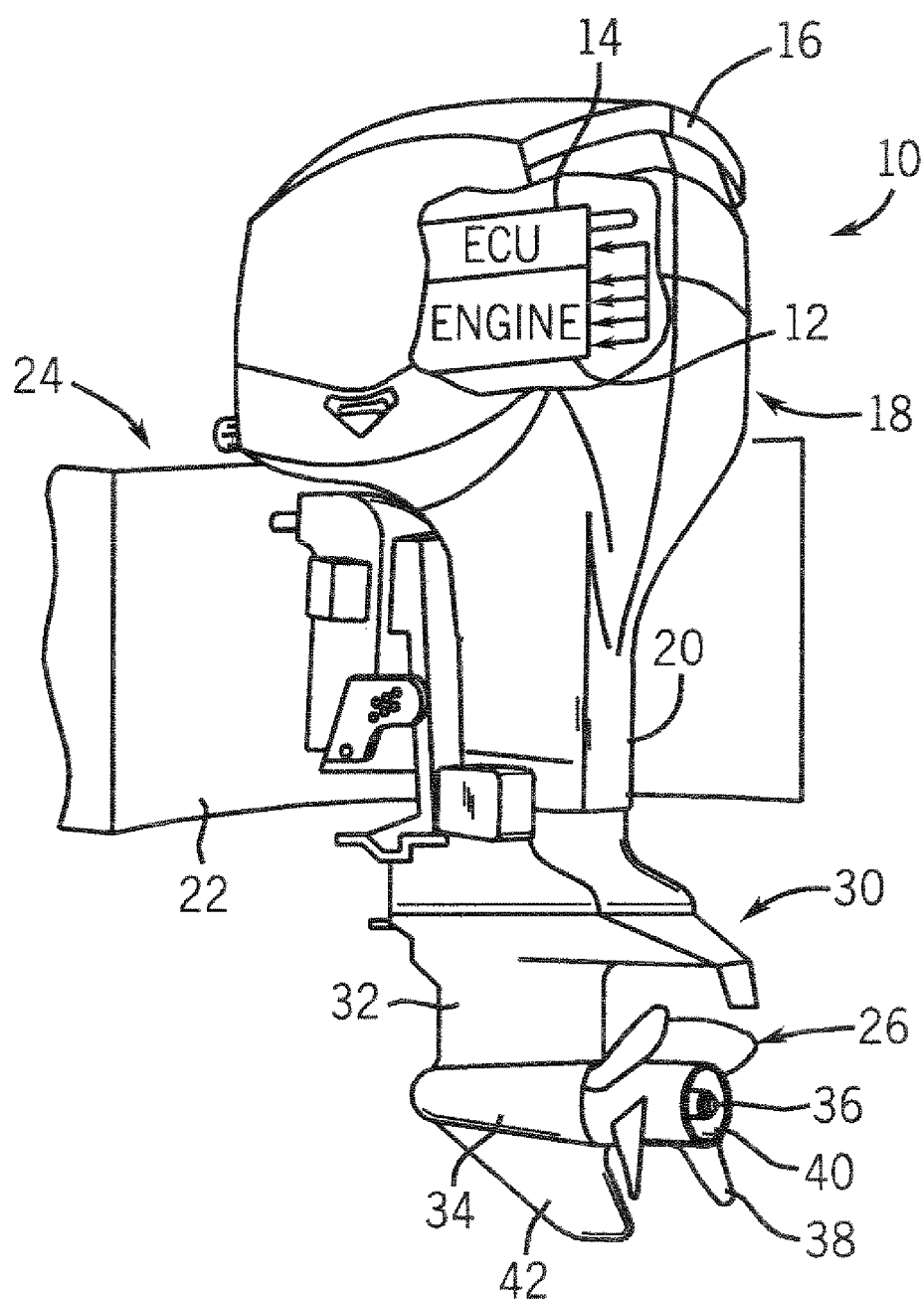
FIG. 1 is a perspective view of an exemplary outboard motor incorporating an engine constructed according to the present invention.

The present invention relates generally to internal combustion engines, and preferably, those incorporating direct fuel injection in a spark-ignited two-cycle gasoline-type engine. FIG. 1 shows an outboard motor 10 having one such engine 12 controlled by an electronic control unit (ECU) 14 under engine cover 16. Engine 12 is housed generally in a powerhead 18 and is supported on a mid-section 20 configured for mounting on a transom 22 of a boat 24 in a known conventional manner. Engine 12 is coupled to transmit power to a propeller 26 to develop thrust and propel boat 24 in a desired direction. A lower unit 30 includes a gear case 32 having a bullet or torpedo section 34 formed therein and housing a propeller shaft 36 that extends rearwardly therefrom. Propeller 26 is driven by propeller shaft 36 and includes a number of fins 38 extending outwardly from a central hub 40 through which exhaust gas from engine 12 is discharged via mid-section 20. A skeg 42 depends vertically downwardly from torpedo section 34 to protect propeller fins 38 and encourage the efficient flow of outboard motor 10 through water.

Moreover, while many believe that two-stroke engines are generally not environmentally friendly engines, such preconceptions are misguided in light of contemporary two-stroke engines. Modern direct injected two-stroke engines and, in particular, those used in EVINRUDE outboard motors, are compliant with not only today's emission standards, but emissions standards well into the future. Further, the illustrated outboard motor has fuel injectors that are extremely fast and responsive. These injectors are not only state-of-the-art in terms of performance, they are so highly tuned that engines so equipped greatly exceed environmental emissions standards for years to come. To obtain such exacting performance, the injectors operate at a rather high voltage, preferably 55 volts.

Figure 2:
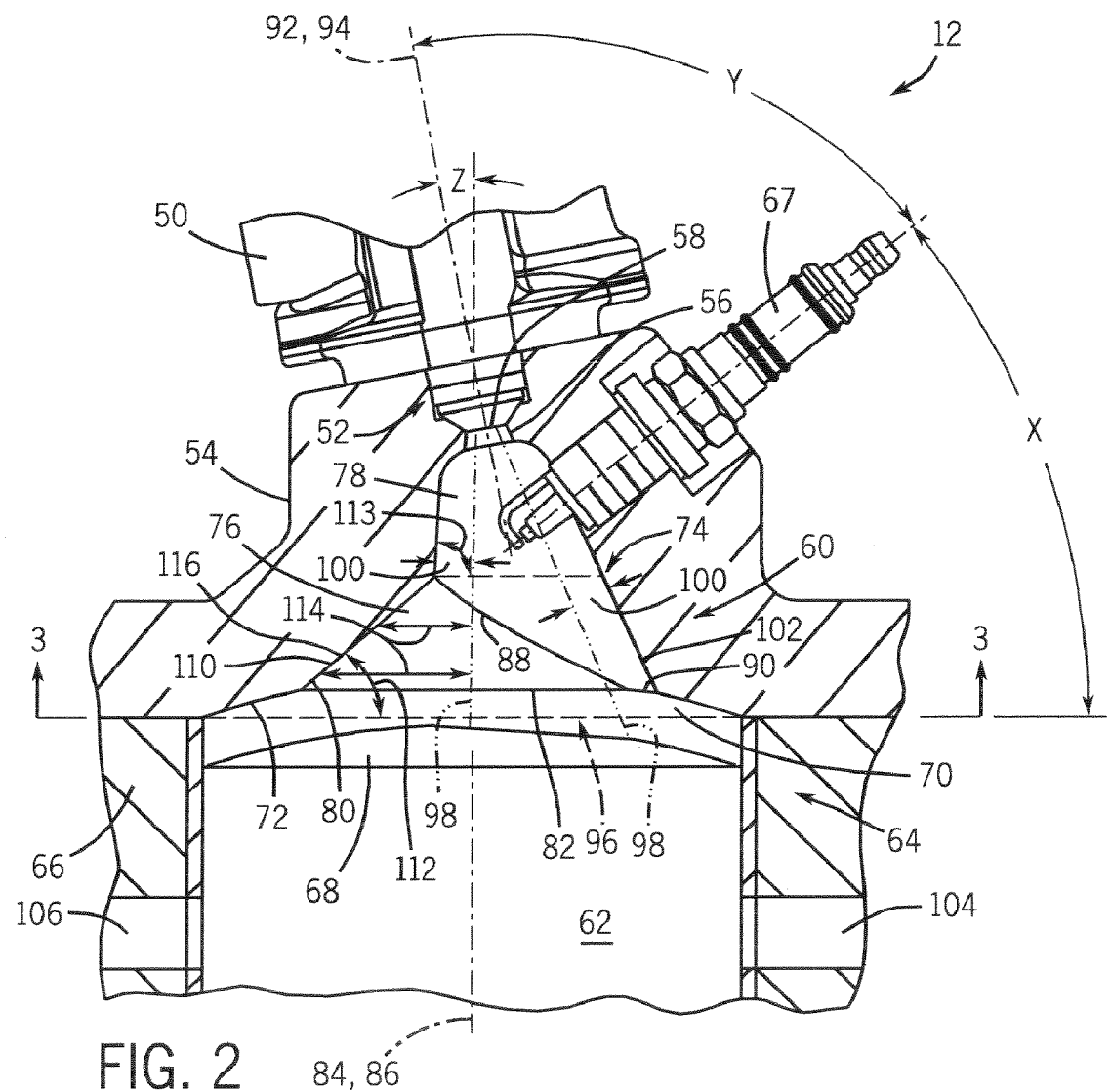
FIG. 2 is a cross-sectional view of an engine cylinder of an engine according to the present invention.

One such injector is show in FIG. 2. A fuel injector 50 is connected to a fuel system of motor 10 and has a nozzle end 52 connected to a cylinder head 54 of engine 12. A nipple recess 56 is formed in cylinder head 54 and constructed to allow a poppet 58 to extend and retract from nozzle end 52 of injector 50. During operation of engine 12, nipple recess 56 is constructed to prevent exposure of poppet 58 to the conditions of the combustion process. As such, nipple recess 56 is not part of a combustion chamber 60 of engine 12.

A piston 62 is disposed in a cylinder 64 which is formed in a block 66 of engine 12. Piston 62 reciprocates in cylinder 64 and is powered by the ignition of a combustion charge in combustion chamber 60. A spark plug 67 extends into combustion chamber 60 and is electrically connected to an ignition system of engine 12. Although only one cylinder of engine 12 is shown, it is understood that the present application is applicable to engines having one or more cylinders and in-line as well as V-type engines. A face 68 of piston 62 is exposed to combustion chamber 60 and, as the piston approaches top dead center, piston 62 compresses the fuel and combustion air that is within combustion chamber 60. A squish zone 70 is formed in combustion chamber 60 and is defined as that portion of combustion chamber 60 between face 68 of piston 62 and a squish region 72 of cylinder head 54. During the compression stroke, as piston 62 approaches top dead center, that portion of the fuel and combustion gas located in the squish zone is subjected to increased compressive forces compared to the general volume of combustion chamber 60.

Cylinder head 54 has a recess 74 formed therein which comprises a significant portion of the total volume of combustion chamber 60. Recess 74 includes a first zone 76 and a second zone 78. A majority of first zone 76 is located closer to piston 62 than second zone 78. First zone 76 has a generally conical three-dimensional shape and a triangular cross-section 80. A first side 82 of triangular cross-section 80 is located adjacent squish zone 70 of combustion chamber 60. First zone 76 also has an axis of symmetry 84 that is coaxial with an axis of symmetry 86 of cylinder bore 64. As such, first zone 76 is generally centrally located in combustion chamber 60.

Second zone 78 extends further into cylinder head 54 and also has a generally conical three-dimensional shape. A majority of lower end 88 of second zone 78 intersects first zone 76 and a portion 90 of lower end 88 of second zone 78 directly intersects squish zone 70. An axis of symmetry 92 of second zone 78 is coaxial with an axis of symmetry 94 of a fuel spray 96 introduced into combustion chamber 60. A periphery 98 of fuel spray 96 passes through second zone 78 with a uniform distance 100 between the periphery 98 of fuel spray 96 and a wall 102 of second zone 78. Such a construction equalizes entrainment flows around the fuel spray in the second zone and results in uniform mixing propagation of combustion gases with fuel spray 96. Additionally, the amount of fuel spray that comes into contact with walls 102 of second zone 78 of combustion chamber 60 is reduced.

Axis of symmetry 94 of fuel spray 96 is also biased from normal to the axis 86 of cylinder 64 such that fuel spray 96 is directed generally toward an intake port 104 and away from an exhaust port 106 of engine 12. Such a construction reduces the amount of fuel spray 96 that is allowed to exit combustion chamber 60 prior to compression and subsequent ignition. As measured from a line generally perpendicular to the direction of piston reciprocation, indicated by line 108, and toward intake port 104, a wall 110 of first zone 76 has an angle of penetration 112 into cylinder head 54. Angle of penetration 112 is defined as an angle formed between the opening of recess 74 into cylinder head 54 and wall 110. Angle of penetration 112 is less than 90 degrees and is preferably 43 degrees.

An angle of penetration 113 of second zone 78 as measured from the same ordinate as angle of penetration 112 to wall 102 is greater than 90 degrees and in one embodiment is approximately 100 degrees. Spark plug 67 enters second zone 78 of recess 74 at an angle X degrees from line 108, in one embodiment is approximately 40 degrees, while injector 50 injects fuel into second zone 78 at an angle Y degrees further from line 108 than spark plug 67, in one embodiment is approximately 62 degrees. That is, fuel spray axis of symmetry 94 is generally aligned with both the axis symmetry 92 of second zone 78 and fuel injector 50. Additionally, axis of symmetry 92 of fuel spray 96 is skewed an angle Z, 11 degrees in one embodiment, from axis of symmetry 86 of cylinder bore 64. Additionally, fuel spray 96 is offset from axis of symmetry 86 of cylinder bore 64 to direct a majority of fuel spray 96 toward an intake side of axis 86 of cylinder bore 64.

As fuel spray 96 passes through second zone 78 of combustion chamber 60, uniform distance 100 is maintained between periphery 98 of fuel spray 96 and wall 102 of second zone 78. The portion of fuel spray 96 that passes into first zone 76 is an unsymmetrical distance, indicated by arrows 114, from a wall 116 of first zone 76. Such a construction centers the combustion charge within the combustion chamber after piston 62 has blocked exhaust port 106 formed in cylinder 64 and also forms a concentric squish zone 70 about combustion chamber 60 of cylinder 64.

Figure 3:
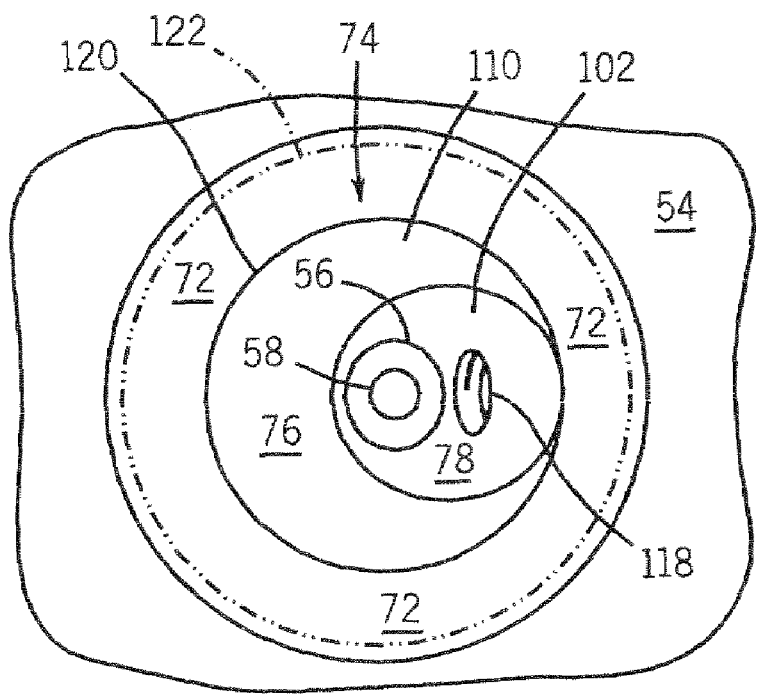
FIG. 3 is a plan view of the cylinder head of the engine cylinder of FIG. 2.

FIG. 3 shows a plan view of cylinder head 54 looking into recess 74. As shown in FIG. 3, spark plug 67 is removed from a threaded hole 118 formed in cylinder head 54. Recess 74 has a perimeter 120 that forms a circular opening in cylinder head 54. Each of first zone 76 and second zone 78 intersect approximately half of squish region 72 of cylinder head 54. Poppet 58 is positioned in nipple recess 56 such that an opening of poppet 58 directs a fuel flow uniformly past walls 102 of second zone 78. The distance 114, as shown in FIG. 2, between wall 110 of first zone 76 and the fuel flow increases as the fuel exits recess 74 toward squish region 72 of cylinder head 54. A perimeter 122 of piston 62 is generally concentrically positioned about perimeter 120 of recess 74 such that squish region 72 is also concentric about piston 62.

Figure 4:
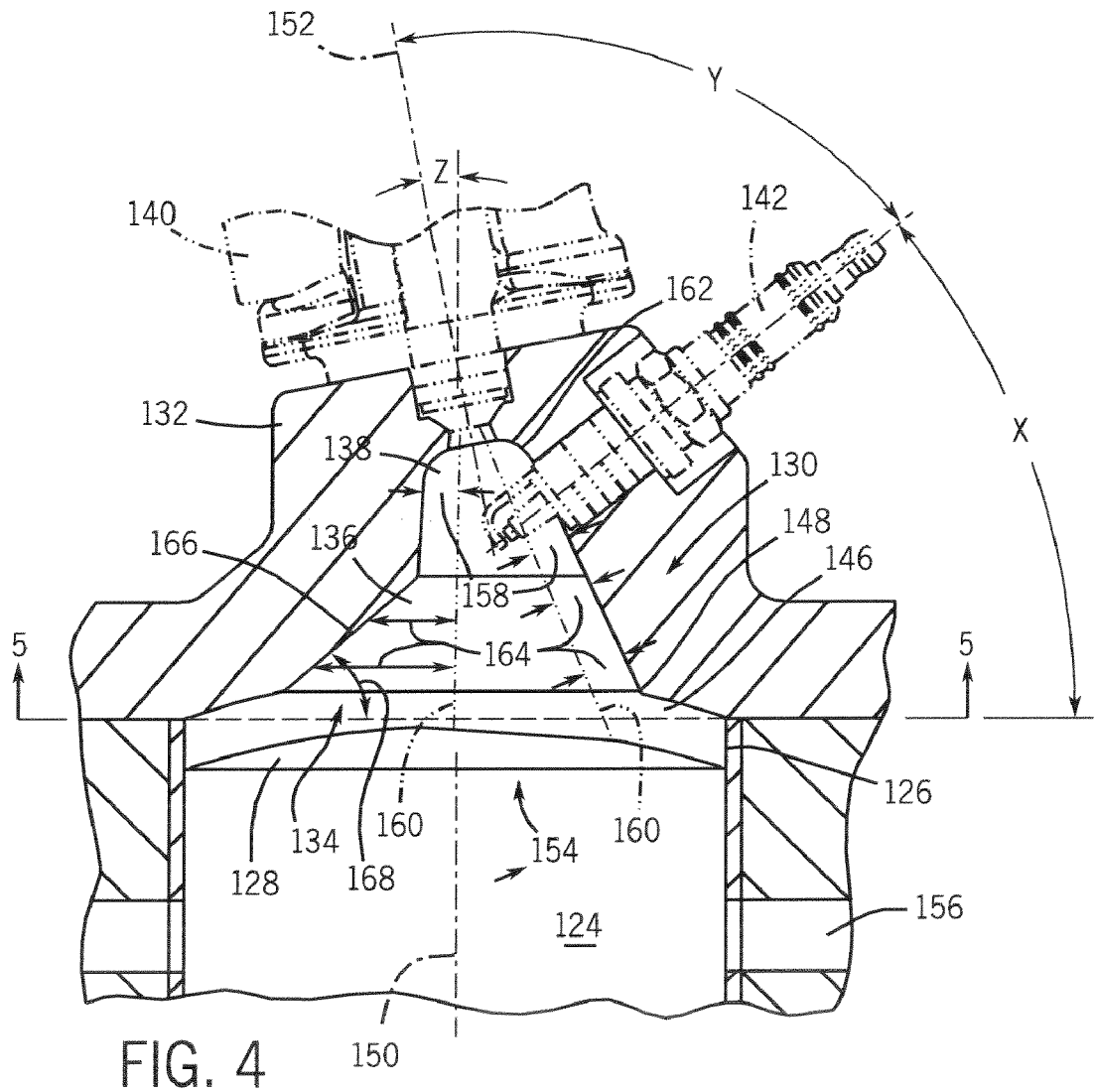
FIG. 4 is a cross-sectional view similar to that of FIG. 2 of an alternate embodiment of the invention.

An alternate embodiment of combustion chamber 60 is shown in FIG. 4. A piston 124 is reciprocally positioned in a cylinder 126 of engine 12. During operation of engine 12, a face 128 of piston 124 compresses the contents of a combustion chamber 130 between piston 124 and a cylinder head 132. A recess 134 is formed in cylinder head 132 and has a first zone 136 and a second zone 138. Second zone 136 has a fuel injector 140 and a spark plug 142 connected thereto such that fuel injected into combustion chamber 130 from fuel injector 140 must pass through second zone 138 and into first zone 136 before exiting recess 134 of cylinder head 132. A squish zone 146 is formed between piston 124 and cylinder head 132 about a perimeter 148 of first zone 136.

First zone 136 is generally conical in shape and extends into cylinder head 132 generally symmetrical about an axis 150 of cylinder 126. First zone 136 is relatively centered about piston face 128 such that squish zone 146 is generally uniform about perimeter 148 of recess 134. The conical shape of first zone 136 is truncated by second zone 138. While second zone 138 generally has a conical shape, it is preferred that it is generally symmetrical about an axis 152 of a fuel spray 154 injected into combustion chamber 130 from fuel injector 140. Axis 152 is tilted from axis 150 toward an intake port 156 of engine 12 and directs fuel spray 154 into the flow of combustion gas entering combustion chamber 130. A uniform spacing, indicated by arrows 158, is maintained between a periphery 160 of fuel spray 154 and a wall 162 of second zone 138. Such a construction reduces the amount of fuel spray impinged on wall 162 and allows for uniform entrainment flows around fuel spray 154 in second zone 138. Additionally, by directing fuel spray 154 in the general direction of intake port 156, the amount of fuel spray allowed to exit combustion chamber 139 prior to combustion charge ignition is reduced.

First zone 136, by being generally centered about axis 150 of cylinder 126, focuses the atomized combustion charge proximate axis 150 near ignition of the combustion charge. In this embodiment, fuel spray 154 passes through first zone 138 with an asymmetric distance, indicated by arrows 164, between fuel spray 154 and a wall 166 of first zone 136 of recess 134. Such a construction maintains a minimum distance between the fuel charge and the combustion walls of the combustion chamber, and generally centers the combustion charge within cylinder 126 immediately prior to ignition of the combustion charge. As such, ignition of the combustion charge can propagate about a majority of the combustion charge with minimal interference from the walls 162, 166 of combustion chamber 130.

First zone 136 has a penetration angle, indicated by angle measure 168, as measured opposite the intake port of less than 90 degrees. In one embodiment, the penetration angle of first zone is approximately 40 degrees. An angle of penetration 170 of second zone 138 measured from the same ordinate as angle of penetration 168 to wall 162 of second zone 138 is greater than 90 degrees and in the one embodiment is approximately 110 degrees. Angle of penetration 170 if generally similar to the angular position of fuel injector 140 relative to intake port 156 of engine 12.

Combustion chamber 130 directs fuel spray 154 towards intake port 156 and maintains uniform spacing between fuel spray 154 and wall 162 of second zone 138. First zone 136 focuses the combustion charge proximate axis 150 of cylinder 126 as piston 124 approaches top dead center and immediately prior to ignition of the combustion charge. Such a construction minimizes the negative impact of the walls of combustion chamber 130 on the entrainment of the combustion gas and fuel charge as well as the negative impact of the walls on the burning of the combustion charge.

Figure 5:
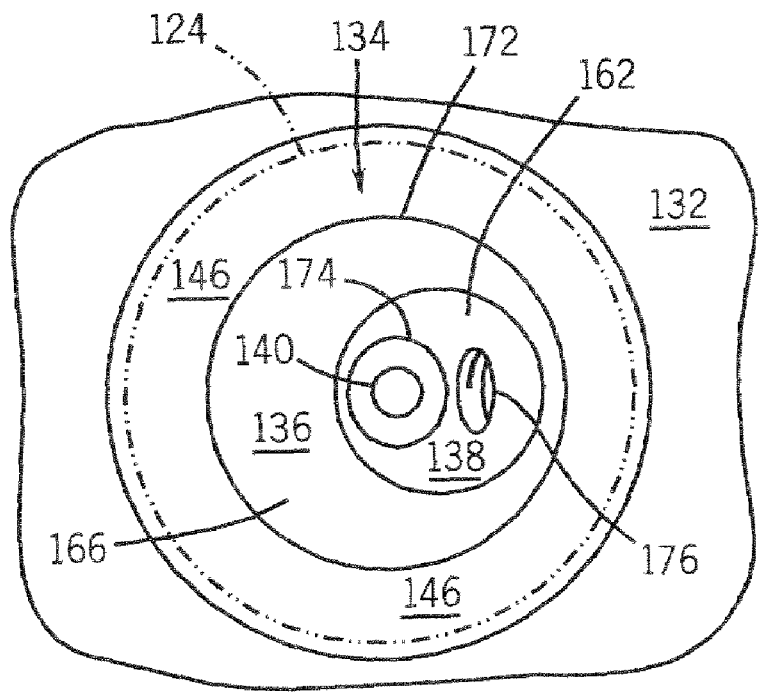
FIG. 5 is a plan view, similar to that of FIG. 3, of the cylinder head of the alternate embodiment shown in FIG. 4.

Recess 134 is shown in FIG. 5 with piston 124 shown in phantom thereover. Squish region 146 is formed in cylinder head 132 between a perimeter 172 of first zone 136 and piston 124. Squish region 146 is generally concentric about recess 134 such that there is generally uniform squish ratio about squish region 146. Second zone 138 is separated from squish zone 146 by first zone 136. As shown in FIG. 4, piston 124 is generally concentric about the perimeter 172 of first zone 136 while second zone 138 is offset and tilted from the axis of first zone 136 and piston 124. Wall 162 of second zone 138 has a first opening 174 to receive an injection end of fuel injector 140 therein and a second opening 176 to receive a spark plug therein.

A combustion chamber according to the present invention includes a first dome section that is generally centrally positioned in the combustion chamber. A second dome section is offset from the first dome section and maintains a uniform distance between a fuel spray and a perimeter of the second dome section. Such a combustion chamber improves combustion by maintaining a generally uniform fuel spray spacing to the combustion chamber walls.

Therefore, in accordance with one embodiment of the present invention, a combustion chamber for a two-cycle engine includes a first zone and a second zone. The first zone has an axis of symmetry generally aligned with a cylinder bore and the second zone has an axis of symmetry generally aligned with a fuel spray projection from a fuel injector. The axis of symmetry of the second zone is skewed and offset from the axis of symmetry of the first zone.

According to another embodiment of the present invention, an engine includes a block having at least one piston reciprocally disposed in a cylinder. A cylinder head is attached to the block over the piston and cylinder and has a combustion chamber aligned with the cylinder defining a squish zone between the piston and cylinder head. The combustion chamber has a lower portion and an upper portion. The lower portion has a cross-sectional shape that is asymmetric about a central axis of the cylinder and the upper portion is positioned generally coaxially about a fuel spray pattern and has a first side configured to receive a spark plug therein and a second side in contact with the lower portion.

In accordance with another embodiment of the present invention, a combustion chamber has a first recess and a second recess. The first recess is formed in a cylinder head and having an angle of penetration of less than 90 degrees from a horizontal as determined from an intake side of a cylinder. The second recess is interconnected with the first recess and has an angle of penetration greater than 90 degrees from the horizontal as determined from the intake side of the cylinder.

According to yet a further embodiment of the present invention, a method of distributing fuel in a combustion chamber is disclosed that includes the steps of: passing a fuel spray past a first portion of a dome of a cylinder head such that a periphery of the fuel spray is equidistant from a wall of the first portion and passing the fuel spray past a second portion of the dome of the cylinder head such that the fuel spray is an unsymmetrical distance from a wall of the second portion.

The present invention has been described in terms of the preferred embodiment, and it is recognized that equivalents, alternatives, and modifications, aside from those expressly stated, are possible and within the scope of the appending claims. While the present invention is shown as being incorporated into an outboard motor, the present invention is equally applicable with other recreational products, some of which include inboard motors, snowmobiles, personal watercrafts, all-terrain vehicles (ATVs), motorcycles, mopeds, power scooters, and the like. Therefore, it is understood that within the context of this application, the term "recreational product" is intended to define products incorporating an internal combustion engine that are not considered a part of the automotive industry. Within the context of this invention, the automotive industry is not believed to be particularly relevant in that the needs and wants of the consumer are radically different between the recreational products industry and the automotive industry. As is readily apparent, the recreational products industry is one in which size, packaging, and weight are all at the forefront of the design process, and while these factors may be somewhat important in the automotive industry, it is quite clear that these criteria take a back seat to many other factors, as evidenced by the proliferation of larger vehicles such as sports utility vehicles (SUV).

What is claimed is:

1. A combustion chamber for a two-cycle engine comprising:
   a first zone formed above a cylinder bore having an axis of symmetry generally aligned with the cylinder bore;
   a second zone having an axis of symmetry generally aligned with a fuel spray projection from a fuel injector;
   an opening formed in the second zone and configured to receive a spark plug having a tip intersecting the fuel spray projection; and
   wherein the axis of symmetry of the second zone is skewed and offset from the axis of symmetry of the first zone.

2. The combustion chamber of claim 1 wherein a cross-section of the first zone has a generally triangular shape.

3. The combustion chamber of claim 2 wherein two ends of the generally triangular shape intersect a squish zone of the combustion chamber.

4. The combustion chamber of claim 1 wherein a portion of the second zone intersects a squish zone of the combustion chamber.

5. The combustion chamber of claim 1 wherein the first zone has a cross-section that is generally trapezoidal.

6. The combustion chamber of claim 5 wherein the first zone isolates the second zone from contact with a squish zone of the combustion chamber.

7. The combustion chamber of claim 1 wherein the second zone has a cross-sectional shape that substantially follows a cross-sectional shape of the fuel spray.

8. The combustion chamber of claim 1 wherein the fuel spray pattern is equidistant from each side wall of the second zone.

9. The combustion chamber of claim 1 incorporated into an internal combustion engine of a recreational product.

10. An engine comprising:
    a block having at least one piston reciprocally disposed in a cylinder;
    a cylinder head attached to the block over the at least one piston and cylinder;

the cylinder head having a combustion chamber aligned with the cylinder defining a squish zone between the piston and cylinder head, the combustion chamber having:
- a lower portion having a cross-sectional shape that is asymmetric about a central axis of the cylinder; and
- an upper portion positioned generally coaxially about a fuel spray pattern and having a first side configured to receive a spark plug therein and a second side in contact with the lower portion.

11. The engine of claim 10 wherein an intersection of the upper portion and the lower portion forms a circular shape.

12. The engine of claim 10 wherein a portion of the upper portion contacts the squish zone.

13. The engine of claim 12 wherein the lower portion has a generally triangular cross-section.

14. The engine of claim 10 wherein the lower portion separates the upper portion from the squish zone.

15. The engine of claim 13 wherein the generally triangular cross-section of the lower portion has one side that is in contact with the squish zone.

16. The engine of claim 14 wherein the lower portion has a trapezoidal cross-section.

17. The engine of claim 10 wherein a perimeter of the piston is concentric about a perimeter of the lower portion.

18. The engine of claim 10 wherein a portion of the fuel spray pattern extends through the lower portion before passing a perimeter of the lower portion.

19. The engine of claim 10 further comprising a spark plug opening extending into the upper portion to receive a spark plug therein having a tip that intersects the fuel spray pattern.

20. The engine of claim 10 further comprising a fuel injector in fluid communication with the combustion chamber.

21. The engine of claim 10 incorporated into at least one of a snowmobile, a lawn/garden equipment, an ATV, a moped, and an outboard motor.

* * * * *